J. C. VOGEL.
GROUND JOINT CONNECTION FOR ELECTRIC CONDUCTORS.
APPLICATION FILED FEB. 29, 1908.
907,542.
Patented Dec. 22, 1908.
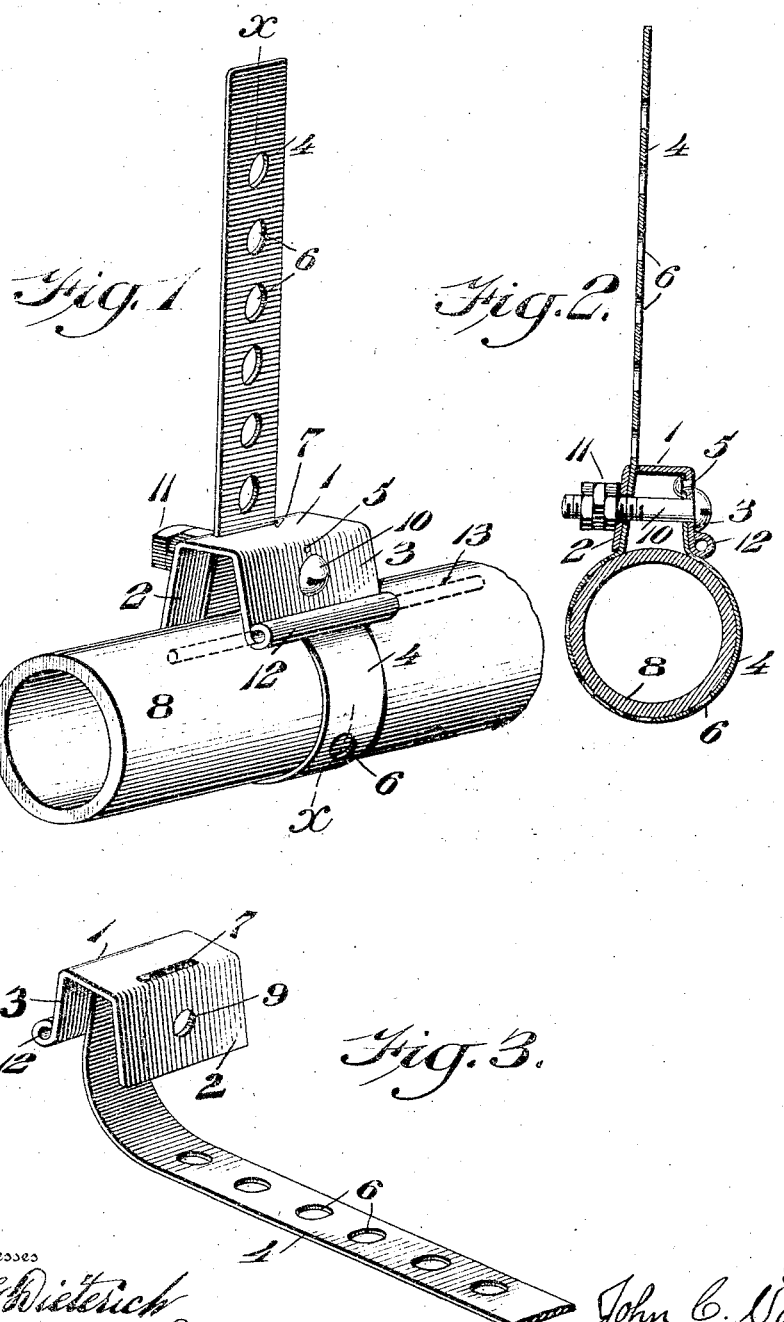

UNITED STATES PATENT OFFICE.

JOHN C. VOGEL, OF PHILADELPHIA, PENNSYLVANIA, ASSIGNOR TO THE FAIRMOUNT ELECTRIC AND MANUFACTURING COMPANY, A CORPORATION OF PENNSYLVANIA.

GROUND-JOINT CONNECTION FOR ELECTRIC CONDUCTORS.

No. 907,542.     Specification of Letters Patent.     Patented Dec. 22, 1908.

Application filed February 29, 1908. Serial No. 418,531.

*To all whom it may concern:*

Be it known that I, JOHN C. VOGEL, a citizen of the United States, residing in the city and county of Philadelphia, State of Pennsylvania, have invented a new and useful Ground-Joint Connection for Electric Conductors, of which the following is a specification.

My invention relates to a new and useful ground connection and consists of new and novel means for connecting the same with a pipe, rod or other suitable conductor.

It further consists of other novel features of construction, all as will be hereinafter fully set forth.

Figure 1 represents a perspective view of a ground connection embodying my invention. Fig. 2 represents a sectional view on line x—x Fig. 1. Fig. 3 represents a perspective view of a portion of the connection in detached position.

Similar numerals of reference indicate corresponding parts in the figures.

Referring to the drawings. I have found in practice, in the ground connections for electric conductors now in use, that, owing to the arrangement of the tightening means, it is apt to destroy the pipe or other support to which the connection is fastened. My invention is designed to overcome this defect and to provide a new and novel connecting means, and in the drawings, I have shown a construction for carrying out my invention, but it will be evident that the arrangement of the parts may be varied and other instrumentalities may be employed which will come within the scope of my invention and I do not therefore desire to be limited in every instance to the exact construction as herein shown and described but desire to make such changes as may be necessary.

1 designates the body portion of my connection having the side plates 2 and 3 and to one of which, in the present instance 3, is connected a band 4 in any suitable manner, as for example by the bolts 5. The band 4 is preferably flexible and of any suitable metal or other good conducting material, said band having a plurality of openings 6 at suitable intervals therein.

In the body 1, I provide a slot or opening 7 which is adapted to receive the free end of the band after the same is applied to the pipe 8 or other suitable support. In the side plates 2 and 3, I provide suitable openings 9 through which is adapted to be passed, a screw 10, the threaded end of which is adapted to receive the nuts 11, it being noted that when the free end of the band 4 is passed through the opening 7 after it has been passed around the pipe 8, one of the openings 6 is brought into alinement with the openings 9 in the plates 2 and 3 and the screw 10 or its equivalent is passed through the openings 9 and the openings 6 in alinement therewith and the nuts 11 are tightened. By reason of this movement, the two side plates 2 and 3 are caused to approach each other, thus tightening the band firmly around the pipe 8 and positively locking the ground connection in position. It will, of course, be understood that any suitable means for operating the said plates may be employed, in order to properly draw the band tightly around the pipe 8. It will be further understood by this means that the ground connection is applicable to various sized pipes and can be firmly attached thereto as described.

Upon the body portion 1, I provide a seat or lug 12 for an electric conductor, which seat, in the present instance, is formed by rolling up the edge of one of the side plates, as 3, as will be seen, the conductor being shown at 13 in dotted lines in Fig. 1 or, if desired, the conductor 13 can be connected between the bridging nuts 11.

Having thus described my invention, what I claim as new and desire to secure by Letters Patent, is:—

1. In a device of the character described, a flexible band, a body portion with which said band is suitably connected, and means for compressing said body for tightening the band around a suitable conductor.

2. In a device of the character described, a body portion, plates thereon, a band adapted to be passed around a suitable conductor, and means for drawing said plates together, whereby the ends of said bands are drawn together for tightening the same around said conductor.

3. In a device of the character described, a body portion, side plates, a band having one end secured to one of said side plates, and a screw passing through said plates and said band, whereby said plates are drawn together and with them, the band, whereby the latter is firmly secured to a conductor.

4. In a device of the character described, a clamping device, a flexible band adapted to encircle a conductor, and a screw adapted to actuate said clamping device whereby the ends of said band are drawn together.

5. In a device of the character described, a body portion, having side plates, an opening therethrough, a band having one end thereof connected with one of said side plates and having openings therein, a screw adapted to pass through the openings of said side plates and through one of the openings of said band, and means whereby said plates are drawn together, compressing the said band around a conductor.

6. In a device of the character described, a band adapted to be passed around a support, means for holding one end of said band, and compression means between said holding means and the support acting on both ends of said band for tightening said band around said support.

7. In a device of the character described, a band, a compressible holder therefor, and compression means for compressing said holder and tightening the band.

8. In a device of the character described, a band, a compressible holder therefor, and compression means for compressing said holder and tightening the band, the ends of the holder and band being oppositely disposed.

9. In a device of the character described, a flexible band, a body portion with which said band is suitably connected, means for compressing said body for tightening the band around a suitable conductor, and a hollow seat or lug on said body for receiving a conducting wire or strip.

JOHN C. VOGEL.

Witnesses:
C. D. McVay,
Harry C. Dalton.